(12) United States Patent
Gan et al.

(10) Patent No.: US 10,414,042 B2
(45) Date of Patent: Sep. 17, 2019

(54) PARALLEL MECHANISM BASED AUTOMATED FIBER PLACEMENT SYSTEM

(71) Applicants: Khalifa University of Science and Technology, Abu Dhabi (AE); AEROSPACE HOLDING COMPANY LLC, Abu Dhabi (AE)

(72) Inventors: Dongming Gan, Abu Dhabi (AE); Jian S. Dai, Abu Dhabi (AE); Jorge Dias, Abu Dhabi (AE); Rehan Umer, Abu Dhabi (AE); Lakmal Seneviratne, Abu Dhabi (AE)

(73) Assignees: KHALIFA UNIVERSITY OF SCIENCE AND TECHNOLOGY, Abu Dhabi (AE); AEROSPACE HOLDING COMPANY LLC, Abu Dhabi (AE)

( * ) Notice: Subject to any disclaimer, the term of this patent is extended or adjusted under 35 U.S.C. 154(b) by 675 days.

(21) Appl. No.: 15/046,706

(22) Filed: Feb. 18, 2016

(65) Prior Publication Data
US 2016/0250749 A1 Sep. 1, 2016

Related U.S. Application Data

(60) Provisional application No. 62/120,952, filed on Feb. 26, 2015.

(51) Int. Cl.
*B25J 17/00* (2006.01)
*B25J 17/02* (2006.01)
(Continued)

(52) U.S. Cl.
CPC .......... *B25J 9/006* (2013.01); *B25J 9/0072* (2013.01); *B25J 9/1697* (2013.01); *B25J 11/005* (2013.01);
(Continued)

(58) Field of Classification Search
CPC . B25J 9/006; B25J 9/0072; B25J 9/003; B25J 9/0045; B25J 9/0054; B25J 9/0063; B25J 9/0033; B25J 9/0066
See application file for complete search history.

(56) References Cited

U.S. PATENT DOCUMENTS

| 5,388,935 A * | 2/1995 | Sheldon | B23Q 1/5462 248/631 |
| 2012/0073738 A1* | 3/2012 | Crothers | B29C 70/323 156/245 |

* cited by examiner

*Primary Examiner* — Jake Cook
(74) *Attorney, Agent, or Firm* — Hayes Soloway PC

(57) ABSTRACT

The present invention introduces a new concept of applying a parallel mechanism in automated fiber placement for aerospace part manufacturing. The proposed system requirements are 4DOF parallel mechanism consisting of two RPS and two UPS limbs with two rotational and two translational motions. Both inverse and forward kinematics models are obtained and solved analytically. Based on the overall Jacobian matrix in screw theory, singularity loci are presented and the singularity-free workspace is correspondingly illustrated. To maximize the singularity-free workspace, locations of the two UPS limbs with the platform and base sizes are used in the optimization which gives a new design of a 4DOF parallel mechanism. A dimensionless Jacobian matrix is also defined and its condition number is used for optimizing the kinematics performance in the optimization process. A numerical example is presented with physical constraint considerations of a test bed design for automated fiber placement.

13 Claims, 11 Drawing Sheets

(51) Int. Cl.
  *B25J 18/00* (2006.01)
  *B25J 9/00* (2006.01)
  *B25J 9/16* (2006.01)
  *B25J 11/00* (2006.01)
  *B29C 70/06* (2006.01)
  *B29C 70/38* (2006.01)
  *B29K 101/10* (2006.01)
  *B29K 101/12* (2006.01)
  *B29K 105/06* (2006.01)
  *B29K 105/08* (2006.01)
  *B29L 31/30* (2006.01)

(52) U.S. Cl.
  CPC ........ *B25J 11/0055* (2013.01); *B25J 11/0075* (2013.01); *B29C 70/06* (2013.01); *B29C 70/382* (2013.01); *B29C 70/386* (2013.01); *B29K 2101/10* (2013.01); *B29K 2101/12* (2013.01); *B29K 2105/06* (2013.01); *B29K 2105/0881* (2013.01); *B29L 2031/3076* (2013.01); *Y10S 901/42* (2013.01); *Y10S 901/43* (2013.01)

(a) for a given d  (b) a circle in θ = π/2 plane

PARALLEL MECHANISM BASED AUTOMATED FIBER PLACEMENT SYSTEM

FIELD OF THE INVENTION

The present invention generally relates to parallel mechanism in automated fiber placement for aerospace part manufacturing.

BACKGROUND OF THE INVENTION

Automated fiber placement (AFP) is an important manufacturing process in composite aerospace part manufacturing and has attracted much interest since future aircraft programs, such as the Boeing 787 and Airbus A350XWB, contain more than 50% by weight of advanced composite components. Also, the use of robot manipulators increases the flexibility of the fiber placement process and allows for the fabrication of more complex structures. Existing AFP research discusses productivity, steering and control, processing conditions, materials, layup modeling and simulation, and functional integration. Robotics work mainly focuses on path planning for AFP while typically a point-cloud is generated for the AFP head to follow to lay the material onto the mold.

Although many robot based AFP systems have been proposed and studied, this technology is still not widely used in industry where manual lay-up is still the main method due to cost constraints and level of complexity of molds. Furthermore, all previous work used serial robots as operation arms to hold the fiber placement head due to the fact that they are widely developed and used in automatic industry. However, serial robots generally have low stiffness and large inertia due to their serially connected structure, which affects their force and precision performance in high-compact-force applications, like AFP. In contrast to serial robots, parallel robots have multiple support limbs with low inertia, high structure stiffness, good positioning accuracy and high speeds. Based on this, they are widely used in the industrial applications requiring high speed and stiffness. Thus in this paper for the first time, a parallel mechanism is introduced in AFP and an optimal design is proposed as a basis for AFP.

In general a 6DOF platform is needed for the AFP operation to have flexibility in manufacturing all kinds of parts with complex mold surfaces. Considering the need of a moving platform to support the parallel mechanism and spindle rotation of the placement head on the parallel mechanism, a 4DOF parallel mechanism with 2T2R (two translations and two rotations) will be sufficient for automated fiber placement. In parallel mechanism research, 6DOF ones have been studied extensively with the Stewart-Gough platform with later focus moving to parallel mechanisms with less than 6DOF represented by many 3DOF ones. Due to the complexity of coupling between rotation and translation and singularity issues, 4DOF parallel mechanisms have not been investigated much and related work is mainly on synthesis. A class of asymmetrical 2T2R parallel mechanisms was synthesized in while symmetrical ones were obtained in using screw theory. Focusing on two rotation motions, and synthesized new 2T2R parallel mechanisms using general function set and Lie group theory respectively. Considering the requirement of a moving base (one translation) and a rotating spindle (one rotation), 2T2R parallel platforms have been used in 5- or 6-axis machine tools. A 2PRR-2PUS parallel mechanism with a moving platform formed by two parts joined with a revolute joint was proposed for a 5-axis machine tool. Reachable workspace of a 2PSS-2PUS parallel mechanism with two spherical joints coincided was studied in for machine tool applications while four possible singularity configurations of a 2UPR-2UPS parallel mechanism were obtained in. Recently, for needle manipulation tasks a class of 2T2R parallel mechanisms were synthesized using screw theory. However, little work has been found on singularity-free workspace analysis and optimal design of 2T2R parallel mechanisms.

SUMMARY OF THE INVENTION

Therefore, the object of the present invention is a 2T2R parallel mechanism is for automated fiber placement where the motion is realized by a 2RPS-2UPS topology. The mechanism size is mainly determined by the two RPS (revolute-prismatic-spherical joints) limbs. Finding the optimized locations of the two UPS (universal-prismatic-spherical joints) limbs is the main objective in the optimal design for giving a large singularity-free workspace and good kinematics performance represented by the condition number of a dimensionless Jacobian matrix. To compare the workspace volume for translation and rotation, an angle-based 3D space is proposed to have a uniform unit by representing the translations in rotations. An optimized mechanism configuration is found and the effect of joint components is also demonstrated, resulting in a practical design for AFP and other applications.

Although many robot based Automated Fiber Placement (AFP) systems have been proposed and used in composites manufacturing industry, but parallel robots are still not used in composites manufacturing. Furthermore, all the previous work applied serial robots as operation arms to hold the fiber placement head due to the fact that they are widely developed and used in automatic industry. However, serial robots generally have low stiffness and large inertia due to their serially connected structure, which affects their force and precision performance in high-compact-force applications, like AFP. In contrast to serial robots, parallel robots may decrease the weight of lay-up heads, offer multiple support limbs with low inertia, high structure stiffness, good positioning accuracy and high speeds.

The proposed 2T2R (two translation and two rotation) parallel mechanism consists of two RPS (revolute joint, prismatic joint and spherical joint) limbs and two UPS (universal joint, prismatic joint and spherical joint) limbs. In each limb, the revolute or universal joint is attached to the base while the spherical joint is on the platform, and prismatic joints are connected in between. The two revolute joints in the RPS limbs are located parallel to each other on the base and make the two limbs work in the same plane perpendicular to these revolute joints. Joints on the platform or base are in 3D space and not constrained on the same plane (the example in the paper made all joints on the plane). All the joints in the system can be commercialized ones or customer designed. For example, the prismatic joint can be electric, hydraulic, pneumatic, or any other forms that can provide linear motion with enough power. The spherical joints can be ball joint or serially connected revolute joints and the universal joint can be cross-link connected or serially connected revolute joints.

The 4-DOF Parallel Mechanism can be combined with a moving base to increase the workspace and add one rotational motion to AFP head on the moving platform to form a 6-DOF system for automated fiber placement manufacturing process. The system can be used to lay-up very complex parts with the ability to adjust to any kind of reinforcing fibers and matrix materials such as thermoset and thermoplastic tapes/prepregs and dry carbon fiber unidirectional materials.

In addition to AFP manufacturing, the proposed mechanism can also be used in many applications with motion operation, like camera orientation, material grasping and manipulation, machining tool, laser cutting, 3D printing, stabilization platform, motion simulator, automatic painting, automatic welding, Non Destructive Testing (NDT) etc.

As a first aspect of the invention, there is provided a robot apparatus comprising:
a parallel mechanism comprising two Revolute-Prismatic-Spherical joint (RPS) limbs and two Universal-Prismatic-Spherical joint (UPS) limbs.

Preferably, the parallel mechanism is adapted to be used for composites manufacturing.

Preferably, the parallel mechanism is adapted to operate an Automated Fiber Placement Head (AFP).

Preferably, the parallel mechanism provides a 4 Degree-Of-Freedom (DOF) movement comprising two rotations and two translations.

Preferably, the prismatic joints are adapted to provide linear motion with enough power.

Preferably, the prismatic joints are electric, hydraulic or pneumatic.

Preferably, the spherical joints are ball joint or serially connected revolute joints.

Preferably, the universal joints are cross-link connected or serially connected revolute joints.

Preferably, the robot further comprises
a platform; and
a base;
wherein the revolute and universal joints are adapted to be connected to the base, the spherical joints are adapted to be connected to the platform and the prismatic joints are adapted to be connected intermediate the revolute/universal and the spherical joints.

Preferably, the two revolute joints in the RPS limbs are located parallel to each other on to the base and adapted to make the two limbs work in the same plane perpendicular to the revolute joints.

Preferably, the joints are in 3D space and not constrained on the same plane.

Preferably, the base is movable enabling a 6 degree-of-freedom movement for the parallel mechanism.

Preferably, the robot apparatus further comprises an Automated Fiber Placement Head (AFP) adapted to be connected to the base.

Preferably, the robot apparatus is adapted for use in composites manufacturing.

Preferably, the robot apparatus is adapted to reinforce fibers and matrix materials comprising thermoset and thermoplastic tapes or prepregs and dry carbon fiber unidirectional materials.

Preferably, the robot apparatus is adapted for use in camera orientation, material grasping and manipulation, machining tool, laser cutting, 3D printing, stabilization platform, motion simulator, automatic painting, automatic welding or non destructive testing.

BRIEF DESCRIPTION OF THE DRAWINGS

The advantages and features of the present invention will become better understood with reference to the following detailed description taken in conjunction with the accompanying drawings, in which.

DETAILED DESCRIPTION OF THE INVENTION

2. A 2T2R Parallel Mechanism Based AFP System

Figure 1:
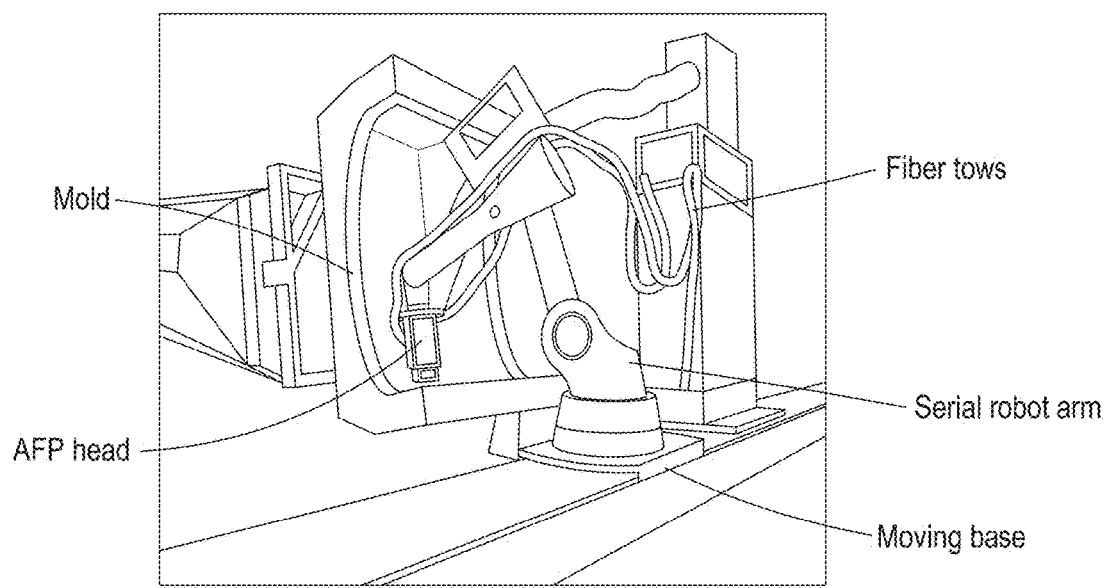
FIG. 1 illustrates a serial robot arm based AFP system according to one embodiment of the present invention.

In AFP systems, fiber tows are guided by a fiber-processing head attached to the end-effector of a robot and carefully placed following a pre-defined robot trajectory as in FIG. 1. To tack the tows on the mold, they are heated and compacted at the same time when the robot is moving. Since the ratio of the mass of payload over the mass of the robot is typically small for 6DOF serial robots, like the KUKA robot in FIG. 1, the ratio is about 210 kg/1150 kg=0.18, the ratio can be larger than 10 for parallel robots. In this case, for the same payload of 210 kg, a 21 kg parallel robot might be enough to support it. Following this, the advantage is obvious considering the space occupation and system cost. Although parallel robots suffers from the smaller workspace than serial ones, a moving base is generally used to enlarge the workspace and it is also common for the serial robots in the industry, like the one in FIG. 1.

Figure 2A:
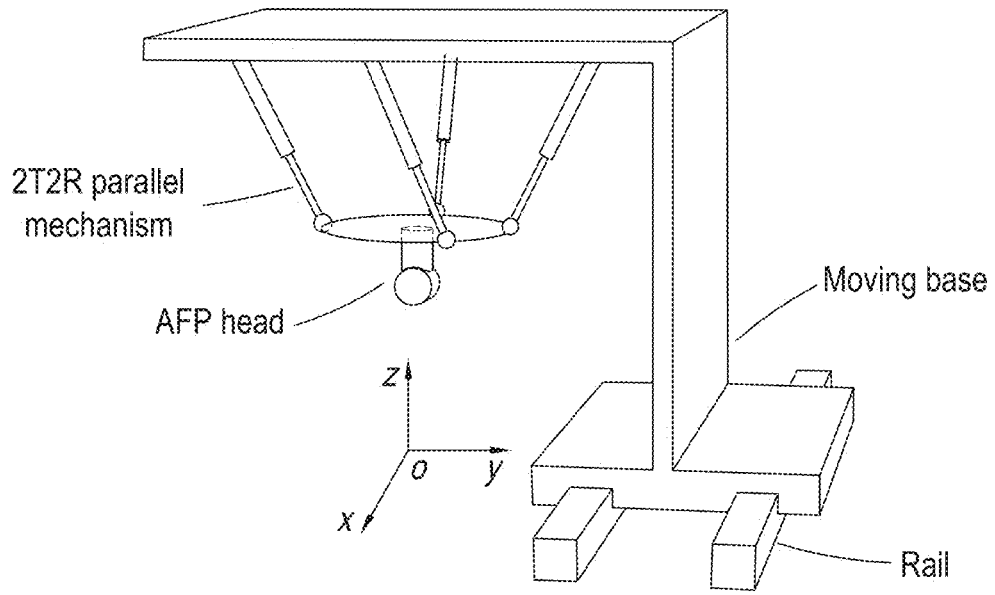
FIG. 2(a) illustrates a 2RPS-2UPS parallel mechanism based AFP system according to one embodiment of the present invention.

Considering one translation DOF giving by a moving base to enlarge the workspace and one rotation DOF from AFP head on the moving platform, a parallel mechanism with two translational and two rotational DOFs is sufficient to avoid redundant movement. The proposed AFP system is shown in FIG. 2(a) which includes a rail-based moving base. The moving base moves along the x-axis and the AFP head can rotate along its axis which is perpendicular to the parallel mechanism platform. Thus, the parallel mechanism needs to have two translations (2T) along y-axis and z-axis and two rotations (2R) about x-axis and y-axis.

Figure 2B:
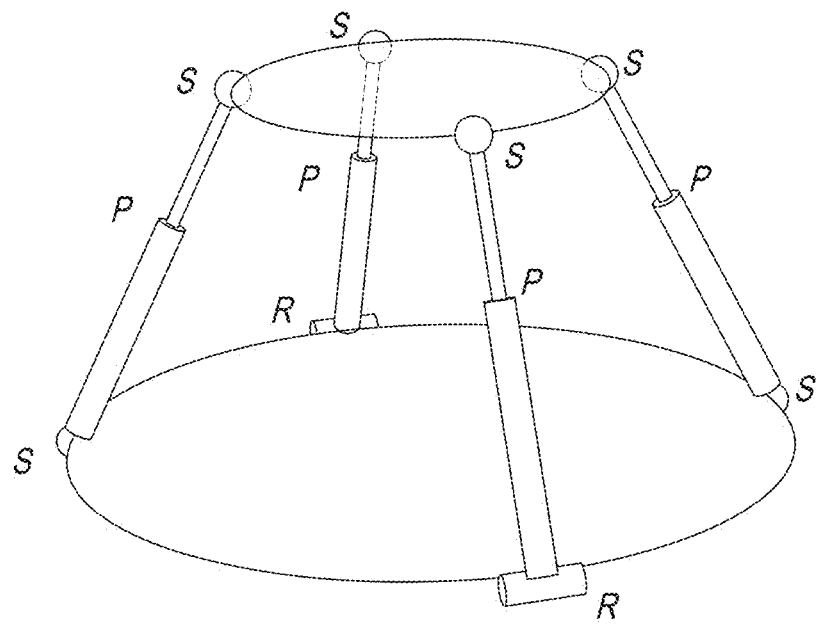
FIG. 2(b) illustrates a 2RPS-2UPS parallel mechanism for a 2RPS-2UPS parallel mechanism based AFP system according to one embodiment of the present invention.

The proposed 2T2R parallel mechanism consists of two RPS limbs and two UPS limbs as shown in FIG. 2(b). In each limb, the revolute or universal joint is attached to the base while the spherical joint is on the platform, and prismatic joints are connected in between. The two revolute joints in the RPS limbs are located parallel to each other on the base and make the two limbs work in the same plane perpendicular to these revolute joints. It is constrained that all the joint centers on the base or platform are in the same plane. Since the UPS limbs do not constrain the platform and each RPS limb provides one constraint force passing through the spherical joint center and parallel to the revolute joint, the platform is subjected to two parallel constraint forces during all the motion and lose a translation motion along these forces and a rotation motion perpendicular to the plane containing these two constraint forces. The four prismatic joints are selected as the actuation for the 4DOF parallel mechanism.

The initial assumption of this study is that the two RPS limbs are relatively fixed while the two UPS limbs can be freely chosen. This will result in variable configurations with different singularity-free workspace and kinematics performance. Thus the following study shows a method of optimizing locations of the two UPS limbs with respect to the RPS limbs and the sizes of the platform and base, to get maximum singularity-free workspace with acceptable kinematics properties. FIG. 2 shows a general configuration where the two UPS limbs are on either sides of the RPS limbs, but the optimal result later has the two UPS limbs on the same side to give a larger singularity-free workspace.

Figure 3:
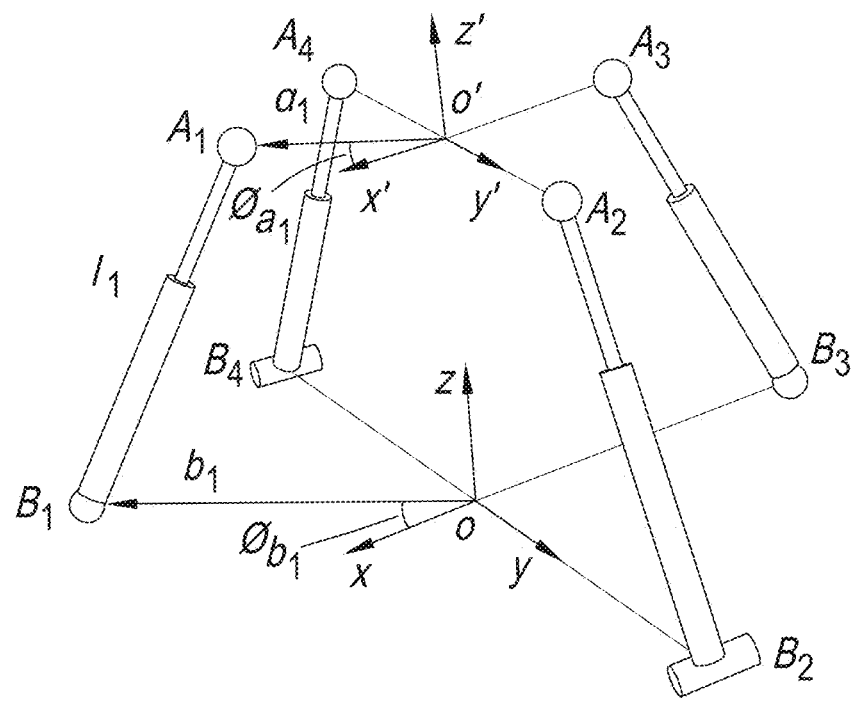
FIG. 3 illustrates a general 2RPS-2UPS parallel mechanism and its representative kinematics model according to one embodiment of the present invention.

3. The 2T2R Parallel Mechanism and Analytical Inverse and Forward Kinematics Analysis:

3.1 Variable Configurations of the 2RPS-2UPS Parallel Mechanism and its Kinematics Model:

A representative kinematics model of the 2RPS-2UPS parallel mechanism is shown in FIG. 3 where the four limbs are numbered from 1 to 4 and the two RPS limbs are number 2 and number 4 respectively. Let $B_i$ denote the center of the base joint and $A_i$ denote the center of the platform spherical joint of the ith (i=1, 2, 3, 4) limb. Set a base coordinate frame oxyz at the middle point o of $B_2B_4$ with z-axis perpendicular to the base plane formed by $B_1B_2B_3B_4$ and x-axis perpendicular to the line $B_2B_4$. Then y-axis is in line with $oB_2$ as in FIG. 3. Attach a platform coordinate frame o'x'y'z' at middle point o' of $A_2A_4$ with z'-axis perpendicular to the platform plane and x-axis perpendicular to $A_2A_4$. When the platform is at the initial configuration, the platform coordinate frame is parallel with the base coordinate frame. Based on these coordinate system settings, the platform will have two translation motions along y-axis and z-axis with two rotations about x-axis and y-axis.

Let $a_i$ denote the constant position vector of platform joint center $A_i$ in the platform coordinate frame o'x'y'z' and $b_i$ be the constant vector of base joint center $B_i$ expressed in the base coordinate frame oxyz. Then the limb distance constraints can be described as $$\begin{cases} (R \cdot a_i + p - b_i)^T (R \cdot a_i + p - b_i) = l_i^2 \\ a_i = a_i(\cos(\phi_{ai}), \sin(\phi_{ai}), 0)^T \\ b_i = b_i(\cos(\phi_{bi}), \sin(\phi_{bi}), 0)^T \end{cases} \quad (1)$$

$$(i = 1, 2, 3, 4)$$

where $l_i$ is the length of limb i, R is the 3 by 3 rotation matrix covering two rotations about x-axis and y-axis, $p=(0,p_y,p_z)^T$ is the translation vector of point o' in the base coordinate system oxyz, $a_i$ is the distance from point $A_i$ to o' and $\phi_{ai}$ is its angle in the platform coordinate frame measured from x'-axis, $b_i$ is the distance from point $B_i$ to o and $\phi_{bi}$ is its angle in the base coordinate frame measured from x-axis. Based on the configuration, $\phi_{b2}=\phi_{a2}=\pi/2$, $\phi_{b4}=\phi_{a4}=3\pi/2$, $a_2=a_4=a$, $b_2=b_4=b$, $a_1=a_3$, $b_1=b_3$ will be used in the optimization design.

Equation (1) gives the general geometric constraint of the 2RPS-2UPS parallel mechanism. It is noted that given R and p the inverse kinematic solution can be obtained directly from (1) to give the four input limb lengths $l_i$. The forward kinematics analysis in general is more complex and the following Section shows an analytical solution.

3.2 Analytical Forward Kinematics:

Based on the geometric structure of the mechanism in FIG. 3, the vector of the spherical joint center $A_i$ in the base coordinate frame oxyz, $a_{io}$, is given by:

$$\begin{cases} a_{2o} = b_2 + (0, -l_2\cos(\alpha_2), l_2\sin(\alpha_2))^T \\ a_{4o} = b_4 + (0, l_4\cos(\alpha_4), l_4\sin(\alpha_4))^T \\ a_{1o} = (x_1, y_1, z_1)^T \\ a_{3o} = k_1 a_{1o} + k_2 a_{2o} + k_4 a_{4o} \end{cases} \quad (2)$$

where $a_i$ (i=2,4) is the angle between limb i and line $B_2B_4$ as in FIG. 2(b), and $k_i$ (i=1,2,4) are constant coefficients to linearly express point $A_3$ by the other three points in the platform plane.

Then considering the geometric shape of the platform and limb lengths, the following equations exist:

$$\begin{cases} (\sqrt{2}\,a)^2 = (a_{2o} - a_{4o})^2 \\ 2aa_1\cos(\phi_{a1}) = (a_{2o} - a_{4o}) \cdot (a_{1o} - (a_{2o} + a_{4o})/2) \\ a_1^2 = (a_{1o} - (a_{2o} + a_{4o})/2)^2 \\ l_1^2 = (b_1 - a_{1o})^2 \\ l_3^2 = (b_3 - a_{3o})^2 \end{cases} \quad (3)$$

where the first one represents the distance between spherical joint $A_2$ and $A_4$, the second one describes the angle $\angle A_1 o' A_2$, the third one is the distance between spherical joint center $A_3$ and the point o', the fourth and the fifth are the limb length expressions of limb 1 and limb 3 which are the same with (1).

Substituting (2) into (3) gives $$\begin{cases} f_1(\alpha_2, \alpha_4, 1) = 0 \\ f_2(\alpha_2, \alpha_4, 1, x_1, y_1, z_1) = 0 \\ f_3(\alpha_2, \alpha_4, 1, x_1, y_1, z_1) + x_1^2 + y_1^2 + z_1^2 = 0 \\ f_4(1, x_1, y_1, z_1) + x_1^2 + y_1^2 + z_1^2 = 0 \\ f_5(\alpha_2, \alpha_4, 1, x_1, y_1, z_1) + k_1^2(x_1^2 + y_1^2 + z_1^2) = 0 \end{cases} \quad (4)$$

where $f_i(\cdot)$ is a linear function of $(x_1, y_1, z_1)$ and include cosine and sine functions of the angle $a_i$.

The last three equations in (4) are linear functions of $(x_1^2, y_1^2, z_1^2)$. Then two new equations can be obtained from these three by eliminating $(x_1^2, y_1^2, z_1^2)$ as $$\begin{cases} f_6(\alpha_2, \alpha_4, 1, x_1, y_1, z_1) = 0 \\ f_7(\alpha_2, \alpha_4, 1, x_1, y_1, z_1) = 0 \end{cases} \quad (5)$$

Thus, $(x_1, y_1, z_1)$ can be eliminated from $f_2$ in (4) and $f_6$, $f_7$ in (5). Substituting the results into $f_1$, $f_4$ and replacing cos $\alpha_i = (1-t_i^2)/(1+t_i^2)$, sin $\alpha_i = 2t_i/(1+t_i^2)$, gives $$\begin{cases} f_8(1, t_2^2, t_4^2, t_2 t_4, t_2^2 t_4^2) = 0 \\ f_9(1, t_2^2, t_2^4, t_2^6, t_2^8, t_2 t_4^j, \ldots, t_2^8 t_4^8) = 0 \end{cases} \quad (6)$$

$(j \neq 0)$

Following Sylvester's dialytic elimination method for the two equations in (6), a univariate equation in $t_4$ of degree 32 is obtained:

$$\sum_{i=0}^{+16} h_i t_4^{2i} = 0 \quad (7)$$

where coefficient $h_i$ are real constants depending on constant mechanism parameters and input data only.

Solving (7), 32 solutions for $t_4$ can be obtained. Then, $t_2$ can be solved by substituting each solution of $t_4$ back to the equations in (6) and solving the common roots. Following this, $(x_1, y_1, z_1)$ can be linearly solved by substituting each pair of solutions of $t_2$ and $t_4$ into $f_2$ in (4) and $f_6$, $f_7$ in (5). Based on this, 32 sets of solutions of $t_2$, $t_4$ and $(x_1, y_1, z_1)$ are obtained and the spherical joint center $A_i$ can be calculated by substituting $\alpha_i = 2 \text{ Arc Tan}(t_i)$ into (2). Then, the platform position and orientation can be determined using the three spherical joint centers as:

$$\begin{cases} y' = (a_{2o} - a_{4o})/|a_{2o} - a_{4o}| \\ z' = (a_{3o} - (a_{2o} + a_{4o})/2) \cdot y'/(a_1 \cos(\phi_{a1})) \\ x' = y' \times z', R = (x', y', z'), p = (a_{2o} + a_{4o})/2 \end{cases} \quad (8)$$

4. Jacobian Matrices and Singularity Loci for Maximum Singularity-Free Workspace:

4.1 Screw Theory Based Overall Jacobian Matrix:

The infinitesimal twist of the moving platform of the 2RPS-2UPS parallel mechanism can be written as a linear combination of instantaneous twists of each limb:

$$\begin{cases} S_p = \dot{\phi}_{i1} S_{i1} + \dot{\phi}_{i2} S_{i2} + \dot{l}_i S_{i3} + \dot{l}_i S_{i4} + \dot{\phi}_{i5} S_{i5} + \dot{\phi}_{i6} S_{i6} & (i=1,3) \\ S_p = \dot{\phi}_{i1} S_{i1} + \dot{l}_i S_{i,3} + \dot{\phi}_{i4} S_{i4} + \dot{\phi}_{i5} S_{i5} + \dot{\phi}_{i6} S_{i6} & (i=2,4) \end{cases} \quad (9)$$

where $S_p$ represents the infinitesimal twist of the moving platform, $S_{ij}$ (j=1,2,3,4,5,6) denotes the unit screw of the jth 1-DOF joint in limb i, $\dot{l}_i$ is the distance rate of the prismatic joint in limb i, and $\dot{\phi}_{ij}$ (j=1,2,4,5,6) represent angular rates of the universal joint and spherical joint in limb i.

Thus by locking the active joints in the limbs temporarily and taking the reciprocal product on both sides of (9), four actuation reciprocal screws and two geometric constraint screws can be found to give the following expression:

$$\begin{bmatrix} S_{11}^r \\ S_{21}^r \\ S_{31}^r \\ S_{41}^r \\ S_{22}^r \\ S_{42}^r \end{bmatrix} \circ S_p = \begin{bmatrix} u_1 & Ra_1 \times u_1 \\ u_2 & Ra_2 \times u_2 \\ u_3 & Ra_3 \times u_3 \\ u_4 & Ra_4 \times u_4 \\ x & Ra_2 \times x \\ x & Ra_4 \times x \end{bmatrix} \circ S_p = J \circ S_p = \begin{bmatrix} J_a \\ J_c \end{bmatrix} \circ S_p = \begin{bmatrix} \dot{l}_1 \\ \dot{l}_2 \\ \dot{l}_3 \\ \dot{l}_4 \\ 0 \\ 0 \end{bmatrix} = \begin{bmatrix} \dot{l}_a \\ 0 \end{bmatrix} \quad (10)$$

where $x=(1,0,0)^T$, $u_i$ is the unit vector of the $i^{th}$ limb direction, $\dot{l}_a$ represents a vector of the four linear input rates, $S_{i1}^r$ (i=1,2,3,4) is the actuation screw reciprocal to all joint motion screws in the ith limb except the prismatic joint screw $S_{i3}$ and it is collinear with the limb, $S_{i2}^r$ (i=2,4) is the reciprocal screw of geometric constraint to all motion screws in limb i and it passes through the spherical joint center with the direction parallel to the revolute joint.

Thus J is the 6 by 6 overall Jacobian matrix. The first four rows are the four actuation forces represented by actuation Jacobian $J_a$ in (10) while the last two rows are constraint forces denoted by constraint Jacobian $J_c$. The zero determinant of the overall Jacobian J represents singular velocity mappings and singular configurations of the parallel mechanism. Due to the some mechanism arrangement symmetry, like the limb 2 and limb 4, and the design that all joints are on the same plane for both the base and platform, the singularity equation from the determinant of the Jacobian J is simplified and further study can also consider the method in to have the potential to simplify the final equation.

Figure 4:
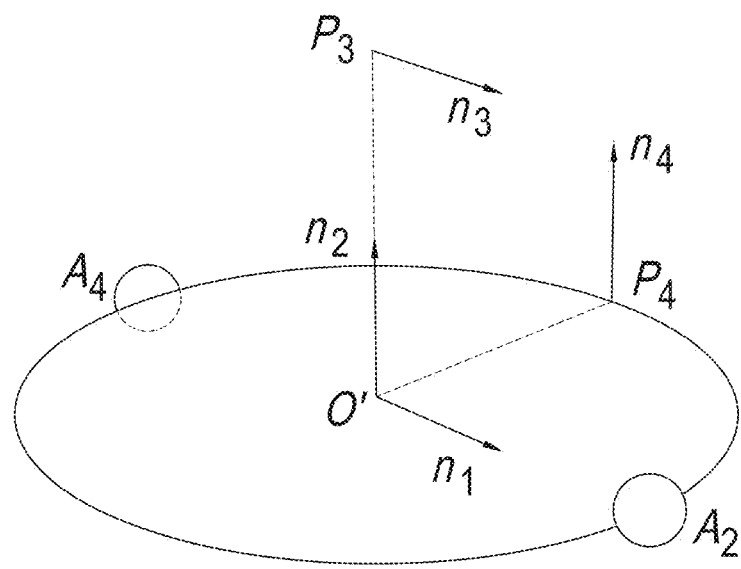
FIG. 4 illustrates selected points and directions on the platform according to one embodiment of the present invention.

4.2 Dimensionless Jacobian Matrix for Kinematics Performance Evaluation:

Since the 2RPS-2UPS parallel mechanism has two translational and two rotational motions, the actuation Jacobian $J_a$ involves both linear and angular velocity mappings. Thus, its singular values are not in the same unit and its condition number cannot be used directly for kinematics performance evaluation. Following this, a dimensionless Jacobian matrix is introduced. One approach is to map the platform velocity to linear velocities in some directions at selected points on the platform representing the platform mobility. This mapping provides a uniform unit between the linear platform point velocities and linear actuation limb inputs. Considering the motion type of the 2RPS-2UPS parallel mechanism, four linear velocities at three points on the platform are selected, FIG. 4.

To present the two translational motion of the platform along y-axis and z-axis, linear velocities along $n_1=(0,1,0)^T$ and $n_2=(0,0,1)^T$ at point O' are selected. For the two rotation motions about x-axis and y-axis, linear velocities along $n_3=(0,1,0)^T$ at point $P_3$ and along $n_4=(0,0,1)^T$ at point $P_4$ are selected. Then these linear velocities can be expressed by the platform velocity in the platform coordinate frame as:

$$v_p = [v_1 \ v_2 \ v_3 \ v_4]^T = J_p M^T S_p \quad 11$$

where $v_i$ is the linear velocity along $n_i$ at the selected point, $$J_p = [S_{n1} \ S_{n2} \ S_{n3} \ S_{n4}]^T, M = \begin{bmatrix} R & 0 \\ 0 & R \end{bmatrix}, S_{ni} = [n_i \ p_i \times n_i]^T$$

$(i = 1, 2, 3, 4)$, $p_i$ is the vector of point i at which linear velocities are selected and $p_1=p_2=(0,0,0)^T$, $p_3=(0,0,a_1)^T$, $p_4=(-a_1,0,0)^T$.

From (10), there is $$S_p = (J^T J)^{-1} J_a^T \dot{l}_a \quad 12$$

Combining (11) and (12), the selected linear velocities can be obtained directly from the linear actuation input velocities:

$$v_p = J_p M^T (J^T J)^{-1} J_a^T \dot{l}_a = J_D^{-1} \dot{l}_a \quad 13$$

where $J_D = (J_p M^T (J^T J)^{-1} J_a^T)^{-1}$ is the 4×4 dimensionless Jacobian matrix.

4.3 Parameterization and Singularity Loci:

From section 4.1, the overall Jacobian matrix J maps the velocities between the manipulator and the actuation input while satisfying the geometric constraints. Once the manipulator meets the singular configuration, this mapping loses its function and the rank of the Jacobian matrix decreases to less than 6. This can be also interpreted that the four actuation forces and two constraint forces in J are linearly dependent. Inversely, identifying the dependent conditions for the constraint forces in the workspace will reveal the singular configurations of the manipulator. This can be analyzed by taking the determinant of J to be zero.

In order to illustrate the singularity loci in a uniform unit, the motion of the platform is described by two rotation angles ($\alpha$, $\beta$) in the rotation matrix R and a lengths d and an angle $\theta$ in the translation vector $p=(0,p_y,p_z)^T=d(0, \cos(\theta), \sin(\theta))^T$. For different length d, 3D singularity loci in the coordinates ($\alpha$, $\beta$, $\theta$) can be shown, FIG. 5.

Figure 5A:
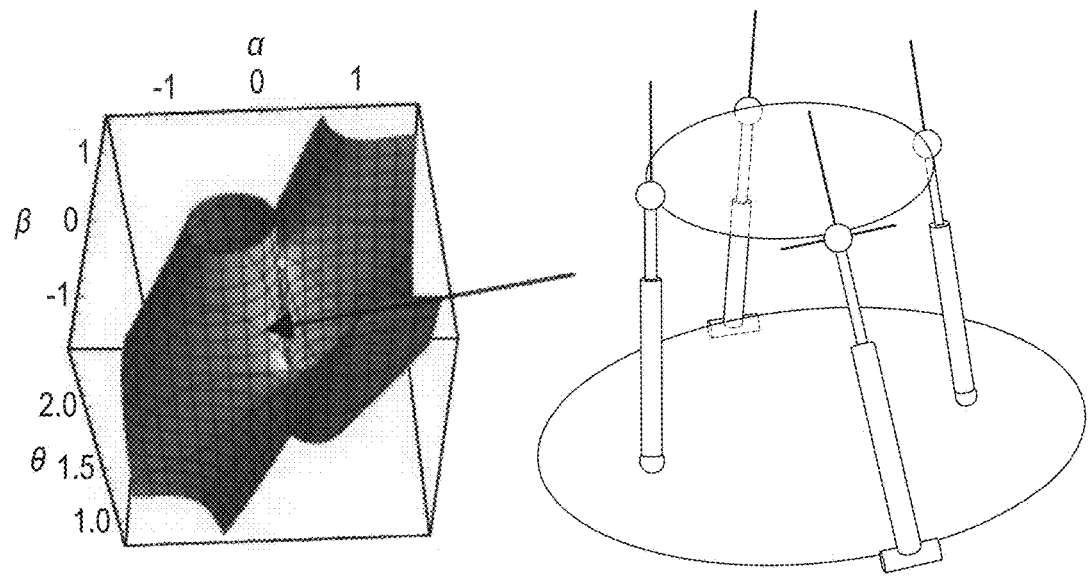
FIG. 5(a) illustrates singularity loci and first singular configuration according to one embodiment of the present invention.
Figure 5B:
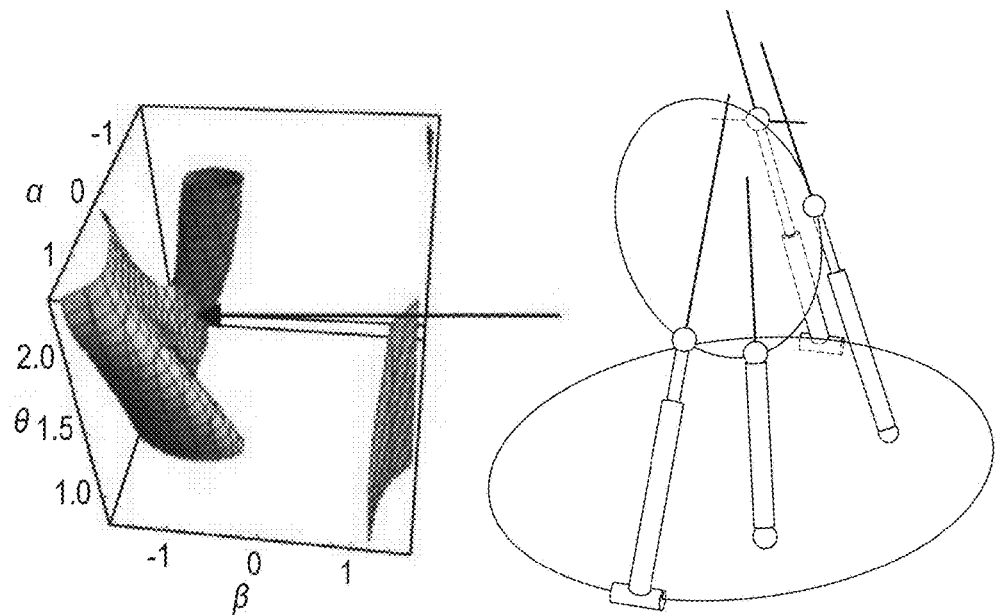
FIG. 5(b) illustrates singularity loci and second singular configuration according to one embodiment of the present invention.

In FIG. 5(a), the singularity loci correspond to the mechanism configuration with two UPS limbs located on the two sides of the plane $B_2A_2A_4B_4$ formed by the two RPS limbs. One singular configuration is shown in FIG. 5(a) which is a Type 5a singularity as the six skew constraint forces (red lines) in the overall Jacobian matrix form a 5-system with one redundant. Similarly, another example is shown in FIG. 5(b) in which the singularity loci are for the configuration with the two UPS limbs on the same side of the plane $B_2A_2A_4B_4$. This singular configuration is also a Type 5a singularity.

Figure 6:
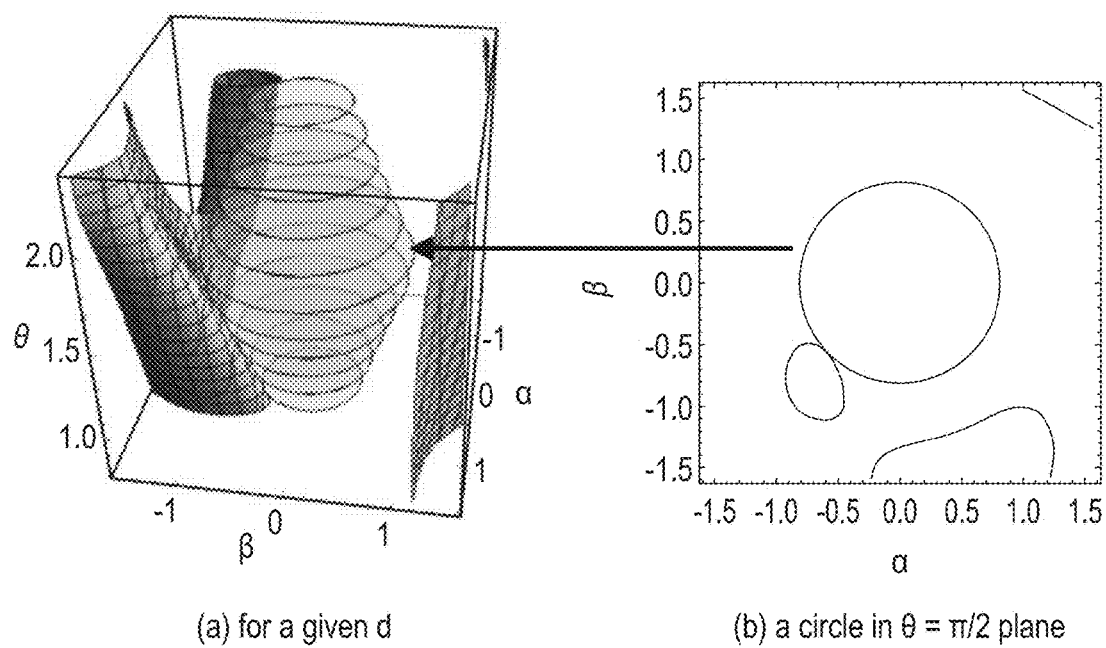
FIG. 6 illustrates maximum singularity-free workspace according to one embodiment of the present invention.

4.4 Maximum Singularity-Free Workspace:

Following the singularity loci in section 4.3, the maximum singularity free workspace is defined as the maximum workspace starting from the initial configuration ($\alpha=0$, $\beta=0$, $\theta=\pi/2$, variable d) to the first point meeting the singularity loci. An example with a given d is shown in FIG. 6(a) in which the red part is the singularity loci and the light blue circles represent the maximum singularity-free workspace with different $\theta$. One of the circles is illustrated in FIG. 6(b) in which the black circle has the maximum radius on the ($\alpha$, $\beta$) plane starting from ($\alpha=0$, $\beta=0$) to the singularity loci in blue. The integration of these circles in the ($\alpha$, $\beta$, $\theta$) coordinate gives the maximum singularity-free workspace corresponding to a given d and mechanism geometric constraints including passive joint ranges. There are several ways to find the maximum circle as shown in and it's not repeated here. Then by integrating all possible platform translation vector length d, the maximum singularity-free workspace of the 2RPS-2UPS parallel mechanism is obtained.

5. Maximum-Singularity-Free Workspace and Kinematics Performance Based Optimal Design:

5.1 Design Variables and Performance Indices:

As discussed in Section 2.1 and FIG. 3, key parameters of the 2RPS-2UPS parallel mechanism in the optimization are the base and platform sizes (b and a) defined by the joint distance between limb 2 and limb 4, and the location parameters of the two UPS limbs with ($\phi_{b1}$, $\phi_{a1}$, $\phi_{b3}$, $\phi_{a3}$, $a_1=a_3$, $b_1=b_3$). To have a relative relation, the length parameters are normalized by the base size b as $\lambda_a=a/b$, $\lambda_{a1}=a_1/b$, $\lambda_{b1}=b_1/b$, $\lambda_d=d/b$, and $a_3$, $b_3$ are replaced by $a_1$, $b_1$. Thus, $\lambda_a$ represents the ratio between the platform and base sizes, $\lambda_{a1}$ and $\lambda_{b1}$ show the ratios of the spherical and universal joint location radii over the base size, $\lambda_d$ represents the translation of the platform. Based on the singularity loci analysis in section 3.3, it is found that the mechanism has a Type 5d singularity as in FIG. 5(a) when the two UPS limbs are separated by the plane $B_2A_2A_4B_4$ formed by the two RPS limbs. Thus, in the following, the two UPS limbs are placed on one side. Considering the symmetrical property of two sides with respect to the plane $B_2A_2A_4B_4$, a range of ($\pi$, $3\pi/2$) corresponding to the right side of the plane $B_2A_2A_4B_4$ for all the four location angles ($\phi_{b1}$, $\phi_{a1}$, $\phi_{b3}$, $\phi_{a3}$) will be used. In addition to this, mechanical constraints including maximum passive joint angles and limb interference should also be considered in the optimization. In the following, passive joint angles are limited in the range as $-\psi_{max} \leq \psi_i \leq \psi_{max}$, where $\psi_i$ denotes rotation angle from its home position of any revolute joint, spherical joint and universal joint while $\psi_{max}$ is given $\pi/4$. The minimum distance between any two limbs is limited to be 0.01 to avoid limb interference and the limb lengths are determined by limiting the platform translation with $0.8 \leq \lambda_d \leq 1.4$.

For the kinematics performance, condition number $k_i = \sigma_{max}/\sigma_{min}$, ($\sigma_{max}$ and $\sigma_{min}$ are the maximum and minimum singular values of the dimensionless Jacobian $J_D$) is a widely used parameter in parallel mechanism design and optimization. As mentioned above, the condition number is calculated using the dimensionless Jacobian considering the coupled mapping with linear and angular velocities.

The optimal design of the 2RPS-2UPS parallel mechanism in this paper is to find the best parameter set to have maximum singularity-free workspace with good kinematics performance. Thus, the optimal design cost function can be given as:

$$\begin{cases} \max\ V \\ \max\ k \end{cases}, k = \frac{V}{\int_V k_i dV} \quad 14$$

where V is the maximum singularity-free workspace, k is the inverse average condition number in the workspace V and is between 0 and 1. The best kinematics performance corresponds to the value 1 when the velocity mapping is isotropic.

5.2 Optimal Design:

5.2.1 Effect of Parameters $a_1$ and $b_1$

Figure 7:
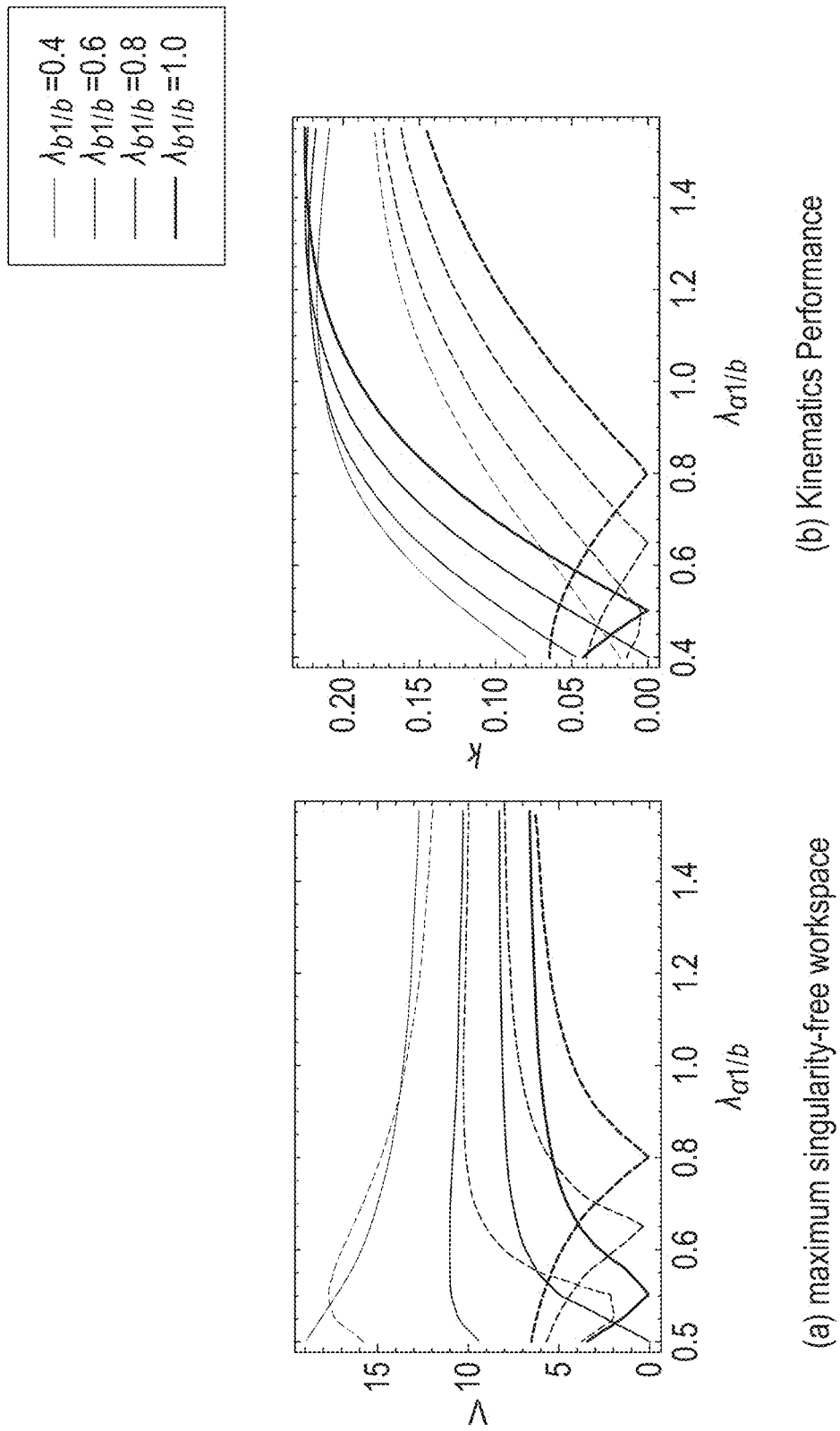
FIG. 7 illustrates effect of parameter $a_1$ and $b_1$ according to one embodiment of the present invention.

Based on the above analysis, the maximum singularity-free workspace and kinematics performance are calculated with variable $\lambda_a$, $\lambda_{a1}$, and $\lambda_{b1}$ as shown in FIG. 7 in which the location angles are given as ($\phi_{b1}=\phi_{a1}=3\pi/4$, $\phi_{b3}=\phi_{a3}=5\pi/4$). In FIG. 7, the solid lines are for $\lambda_a=0.5$ and dashed lines are with $\lambda_a=0.8$ which is the same for the following analysis. For each $\lambda_a$ (solid or dashed) case, the different color lines are for variable $\lambda_{b1}$ and in each line $\lambda_{a1}$ changes in the range (0.4, 1.6) as shown in the horizontal axis. In FIG. 7, comparing the solid and dashed lines it can be seen that a smaller ratio between the platform size and the base size generally gives larger maximum singularity-free workspace V and better kinematics performance. Similarly, the increase of ratio $\lambda_{b1}$ (the location radius of the UPS limbs on the base over the base size) decreases workspace V and the kinematics performance. In FIG. 7(a), when $\lambda_{b1}=0.6$ is a separate line (green lines) at which the workspace is balanced at a value even $\lambda_{a1}$ changes. The workspace increases with the increase of $\lambda_{a1}$ when $\lambda_{b1}>0.6$ (blue, black, purple) and it decreases when $\lambda_{b1}<0.6$ (red). For the kinematics performance in FIG. 7(b), a bigger number of $\lambda_{a1}$ gives better performance based on the inverse average condition number. In both figures in FIG. 7, there are some points close to zero. This is due to the singularity loci being close to the initial configuration ($\alpha=0$, $\beta=0$, $\theta=\pi/2$, variable d) resulting in a very small singularity-free workspace and poor kinematics performance.

5.2.2 Effect of Parameters $\phi_{b1}$ and $\phi_{a1}$

Figure 8:
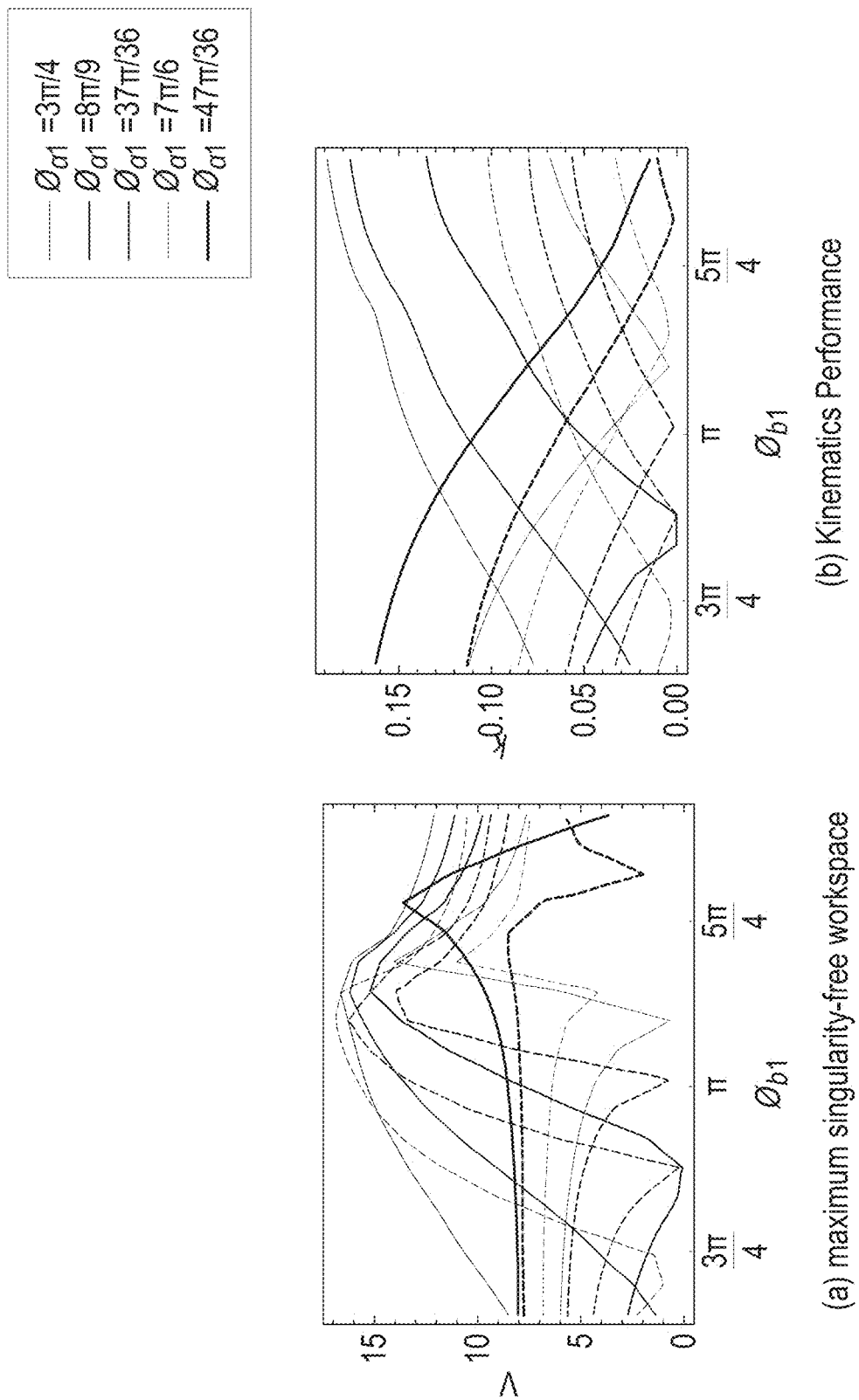
FIG. 8 illustrates effect of parameter $\emptyset_{b1}$ and $\emptyset_{a1}$ according to one embodiment of the present invention.

Parameters $\phi_{b1}$ and $\phi_{a1}$ represent the locations of the two ends of limb 1 on the platform and on the base. From FIG. 7 and the analysis, $\lambda_{b1}=0.6$ and $\lambda_{a1}=0.5$ is selected in the following location angle optimization. The effect on both singularity-free workspace V and kinematics performance of parameter $\phi_{b1}$ and $\phi_{a1}$ while $\phi_{b3}=\phi_{a3}=5\pi/4$ is shown in FIG. 8 in which solid lines are for $\lambda_a=0.5$ and dashed lines for $\lambda_a=0.8$. The different color lines are for different angles of $\phi_{a1}$, representing the location of the spherical joint in limb 1 on the platform. Similar with FIG. 7, a smaller ratio $\lambda_a$ of platform over base size provides a larger singularity-free workspace and better performance by comparing the same color lines in solid and dashed forms. Comparing among the colors in FIG. 8(a), when $\phi_{a1}$ is smaller, e.g. when the spherical joint of limb 1 on the platform is close to that of limb 2, the singularity-free workspace is larger. For a given $\phi_{a1}$, V increases with the increase of $\phi_{b1}$ and the spherical joint center of limb 1 is close to that of limb 3 on the platform. When $\phi_{b1}$ increases further, the workspace decreases. This is a little different for the kinematics performance in FIG. 8(b) in which both smaller $\phi_{a1}$ (red line) and bigger $\phi_{a1}$ (purple line) show bigger values of the inverse condition number. This indicates that the spherical joint of limb 1 should be close to either limb 2 or limb 4. To have better kinematics performance for a given $\phi_{a1}$, $\phi_{b1}$ should be big when $\phi_{a1}$ is small and $\phi_{b1}$ should be small when $\phi_{a1}$ is big. Thus the spherical joint and the universal joint in limb 1 should be away to each other.

It is noted that parameters $\phi_{b3}$ and $\phi_{a3}$ have the same effect as $\phi_{a1}$ and $\phi_{b1}$, considering the symmetrical structure of the parallel mechanism and same form of limb 1 and limb 3. Thus, the above results from FIG. 8 can be directly applied to limb 3.

5.2.3 Effect of Parameters $\phi_{a1}$ and $\phi_{a3}$

Figure 9:
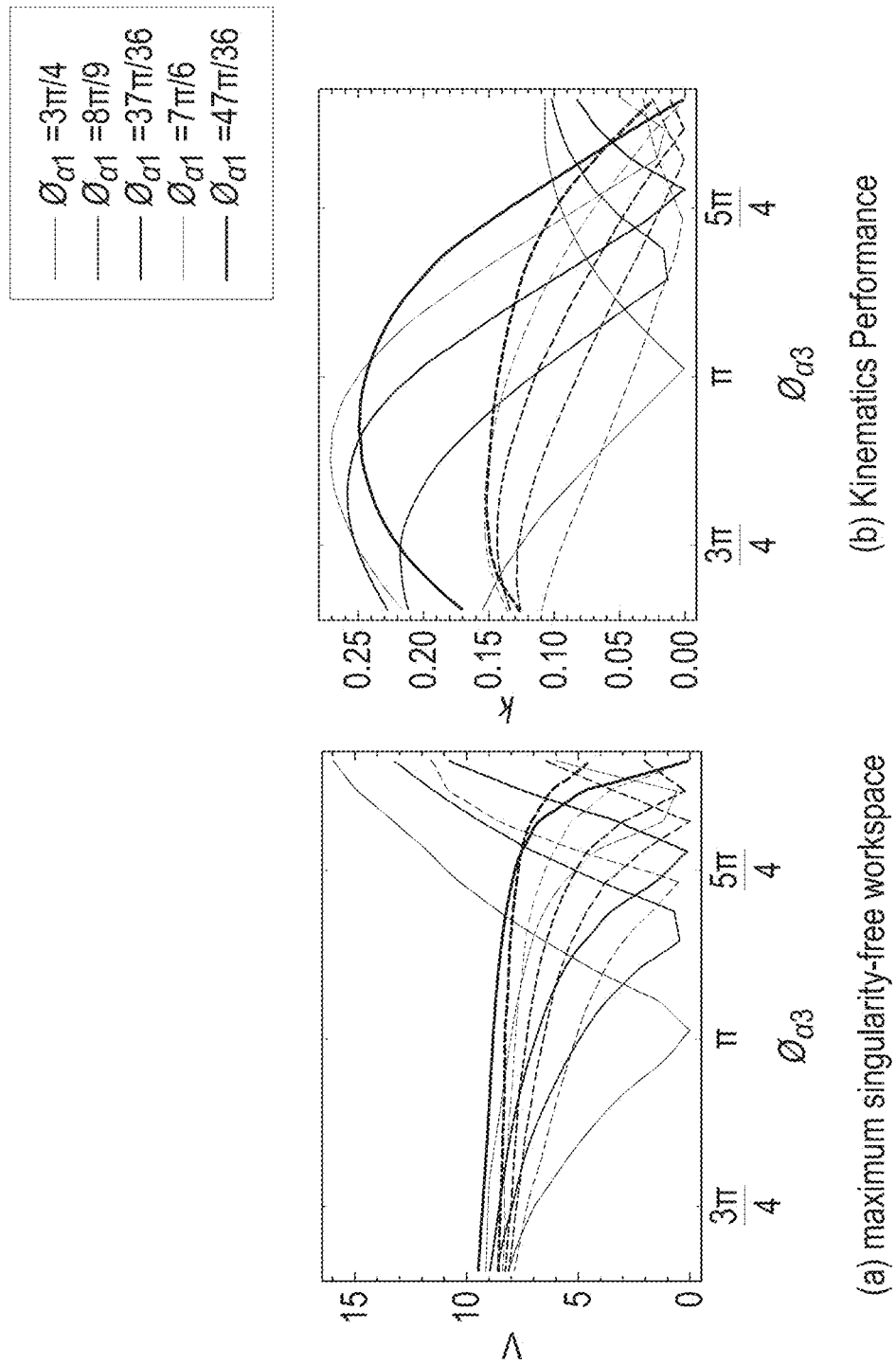
FIG. 9 illustrates effect of parameters $\emptyset_{a1}$ and $\emptyset_{a3}$ according to one embodiment of the present invention.

The two parameters $\phi_{a1}$ and $\phi_{a3}$ represent the locations of the spherical joints of limb 1 and limb 3 on the platform. FIG. 9 shows their effect on the maximum singularity-free workspace and kinematics performance while $\phi_{b1}=3\pi/4$, $\phi_{b3}=5\pi/4$. Solid lines are for $\lambda_a=0.5$, dashed lines for $\lambda_a=0.8$ and different color lines for different angles of $\phi_{a1}$. It can be seen that a smaller $\lambda_a$ gives much better kinematics performance and a larger singularity-free workspace when $\phi_{a3}$ is large, e.g. the spherical joint of limb 3 is close to that of limb 4 on the platform. For V, it is preferable to have smaller $\phi_{a1}$ and bigger $\phi_{a3}$ while for the kinematics performance it is better to have both of them close to $\pi$ as in FIG. 9.

5.2.4 Effect of Parameters $\phi_{b1}$ and $\phi_{b3}$

Figure 10:
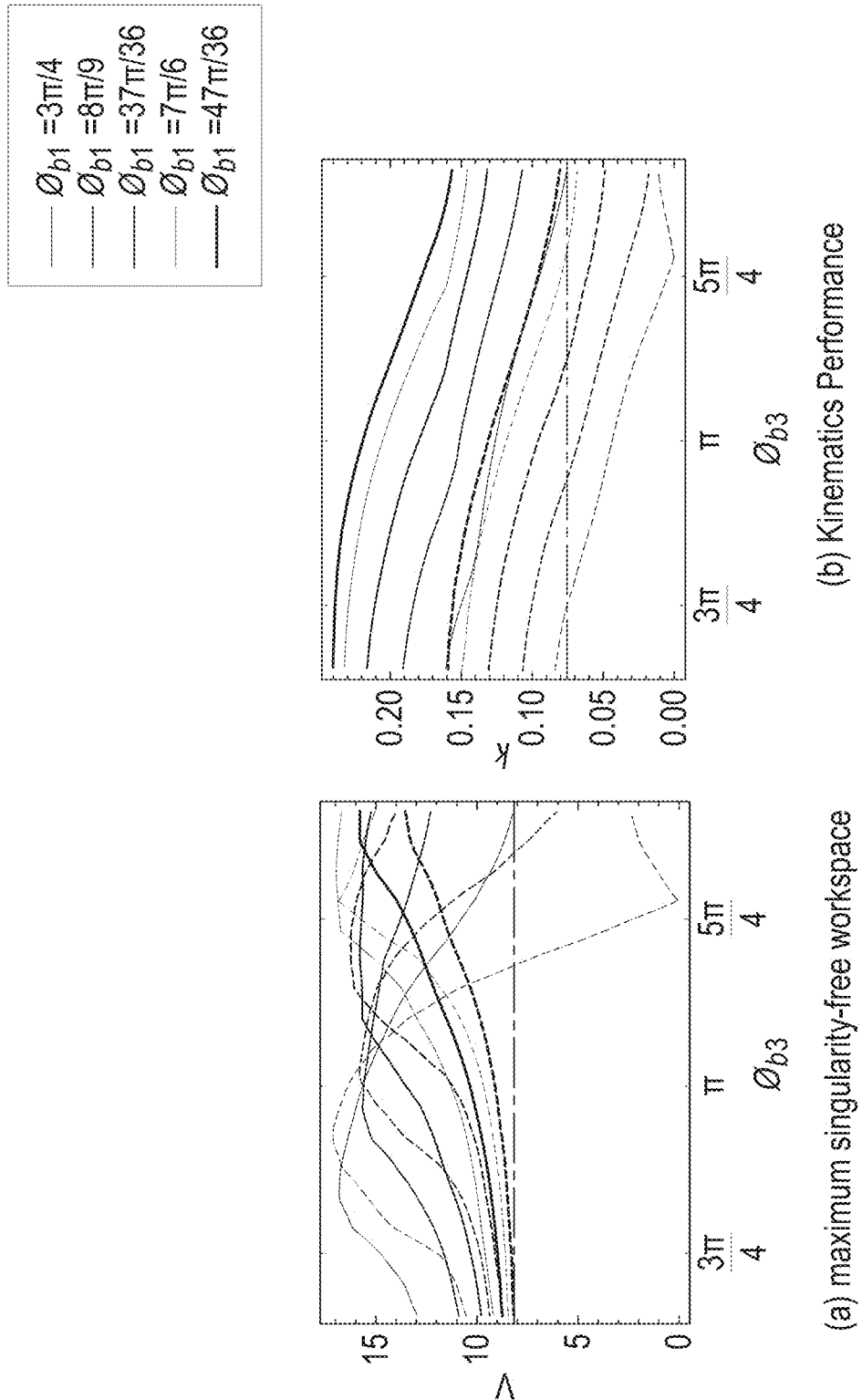
FIG. 10 illustrates effect of parameters $\emptyset_{b1}$ and $\emptyset_{b3}$ according to one embodiment of the present invention.

The two parameters $\phi_{b1}$ and $\phi_{b3}$ represent the locations of the universal joints of limb 1 and limb 3 on the base. The result is shown in FIG. 10 in which solid lines are for $\lambda_a=0.5$ and dashed lines for $\lambda_a=0.8$ while different colors are for different $\phi_{b1}$ increasing from red, green, blue, black to purple. In general, dashed lines are lower than solid ones, indicating that a smaller $\lambda_a$ is better. For the maximum singularity-free workspace in FIG. 10(a), smaller $\phi_{b1}$ corresponds to larger V when $\phi_{b3}$ is less than $\pi$, while it is opposite when $\phi_{b3}$ is less than $5\pi/4$. This means that it's better to have the two universal joints of limb 1 and limb 3 to be close to have a larger singularity-free workspace. The trend of the kinematics performance curves is much clearer as in FIG. 10(b) comparing with the workspace ones. It is seen that a smaller $\phi_{b3}$ and a larger $\phi_{b1}$ give the best kinematics performance as shown by the top purple line. This needs the two UPS limbs to be crossed and the two universal joints far away from each other.

Figure 11:
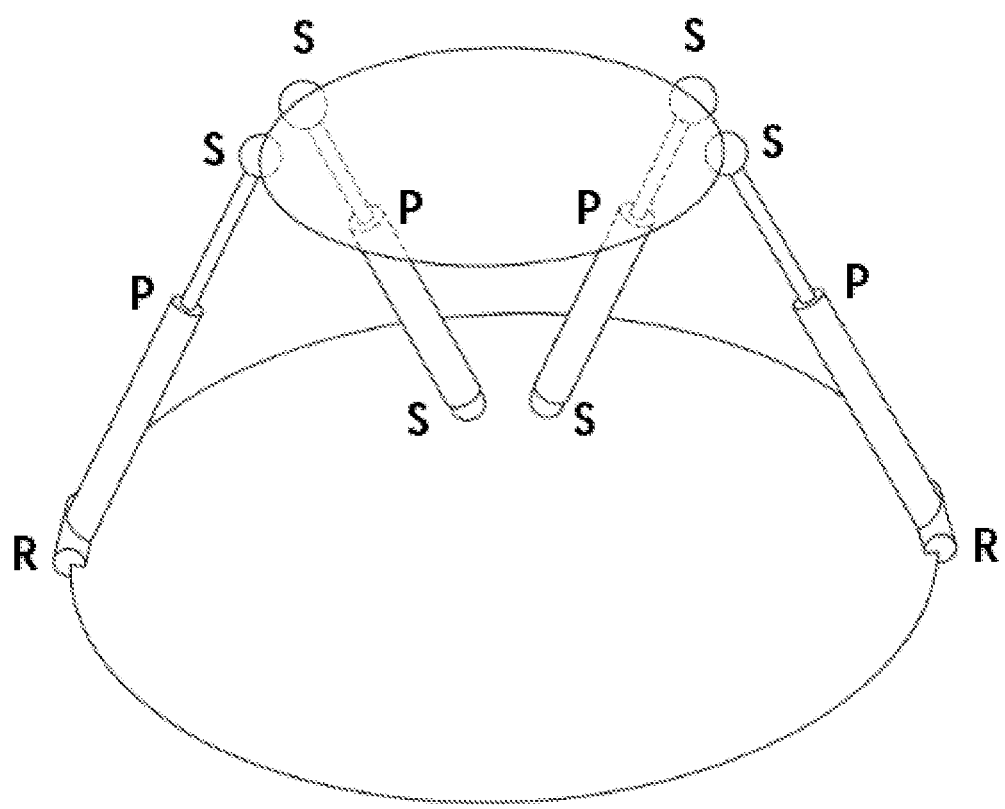
FIG. 11 illustrates the optimized mechanism configuration according to one embodiment of the present invention.

To conclude the above analysis, the ratio (a/b) between the platform size (a) and the base size (b) should be small for both singularity-free workspace and kinematics performance. The spherical joints on the platform ($a_1$) and universal joints on the base ($b_1$) in limb 1 and limb 3 should be close to limb 2 and limb 4 to have large singularity-free workspace while they have to be crossed to give good kinematics performance. To compromise these and avoid limb interference, a "V" shape assembly of limb 1 and limb 3 can be obtained. For this, there are also two solutions while one is to assemble the two spherical joints on the platform close to each other and the other is to let the two universal joints on the base close to each other. However, comparing FIG. 9 and FIG. 10 it is clear that a better combination of both singularity-free workspace and kinematics performance can be obtained by selecting the latter way with the two universal joints close to each other and the two spherical joints separate on the platform. Based on these, the following optimized mechanism design is obtained, FIG. 11.

6. An Optimized 2T2R Parallel Mechanism for AFP

In this section a design example is given by following the above optimization procedures. The previous section gives the whole map for mechanism design parameters for singularity-free workspace and kinematics performance. In specific design, effect from selected mechanical components on the maximum singularity-free workspace should be also figured out.

In general, the platform and base sizes (a and b) can be determined by considering the actual application requirement. To hold the fiber placement head, a minimum size of the platform should be used. Following the above analysis, this minimum size should be selected to have a small platform size over base size ratio (a/b) for large singularity-free workspace and good kinematics performance. The selection for the location of the limb 1 and limb 3 on the platform ($a_1$) and on the base ($b_1$) follows the rule shown in FIG. 6 in which a relatively small $b_1$ and a compromised $a_1$ should be selected. Limb lengths and strokes and maximum passive joint angles relate to component selection which can be optimized by comparing different sizes. Here the limb lengths and strokes are for the prismatic joints and the maximum passive joint angles are for the spherical joints, universal joints and revolute joints. The former can be represented by a stroke ratio as $$\lambda_l = \frac{l_{max} - l_{min}}{l_{min}} \qquad 15$$

where $l_{max}$ and $l_{min}$ represent the maximum and minimum limb lengths respectively while all the limbs have the same size. In the following an example will be given to optimize the selection of $\lambda_l$ and $\psi_{max}$ based on the optimized mechanism configuration in FIG. 11. Basic parameters are given as a=0.18, b=0.3, $a_1$=0.18, $b_1$=0.18, $\phi_{b1}$=17$\pi$/18, $\phi_{a1}$=3$\pi$/4, $\phi_{b3}$=19$\pi$/18, $\phi_{a3}$=5$\pi$/4. The workspace volume and kinematics performance are calculated as in FIG. 12 for which limb interference is included with minimum distance between any two limbs as 0.01.

Figure 12:
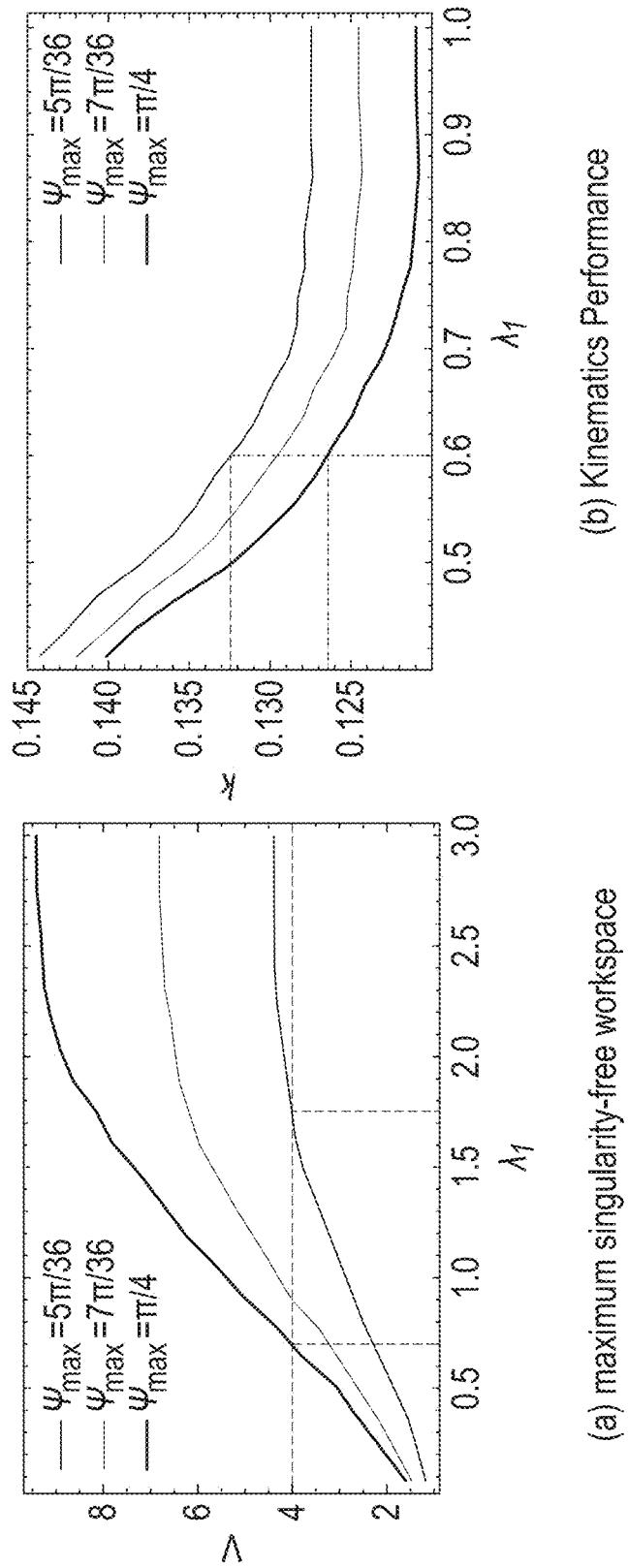
FIG. 12 illustrates effect of parameters $\lambda_l$ and $\psi_{max}$ according to one embodiment of the present invention.

From FIG. 12, it can be seen that the singularity-free workspace increases with the increase of the stroke ratio $\lambda_l$ but the kinematics performance decreases at the same time. This is due to the expanded workspace part closer to singularity configurations and hence the kinematics performance is worse. Similarly, a larger maximum passive rotation joint angle, $\psi_{max}$, will give a larger singularity-free workspace but worse average kinematics performance as in FIG. 12. These conclusions are actually intuitive since a larger joint workspace will allow a larger platform workspace. FIG. 12 not only shows this effect, but also gives a way in selecting the limb stroke and passive rotation joints. To have the singularity-free workspace V=4 as an example, the available stroke ratio $\lambda_l$ is between 0.54 and 0.75 giving the maximum passive rotation joint angle $\psi_{max}$ between $5\pi/36$ and $\pi/4$. Once a stroke is selected, for example $\lambda_l$=0.6, the corresponding kinematics performance can be obtained in FIG. 12(b) with $0.127 \leq k \leq 0.133$. It's also noted that to have a better kinematics performance, the smallest $\psi_{max}$=$5\pi/36$ should be selected in the design corresponding to the red line.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The embodiments were chosen and described in order to best explain the principles of the present invention and its practical application, and to thereby enable others skilled in the art to best utilize the present invention and various embodiments with various modifications as are suited to the particular use contemplated. It is understood that various omissions and substitutions of equivalents are contemplated as circumstances may suggest or render expedient, but such omissions and substitutions are intended to cover the application or implementation without departing from the spirit or scope of the present invention.

The invention claimed is:

1. A robot apparatus employing a two translations and two rotations (2T2R) parallel mechanism for providing a singularity-free workspace, comprising:
   two Revolute-Prismatic-Spherical joint (RPS) limbs;
   two Universal-Prismatic-Spherical joint (UPS) limbs;
   a moveable base; and
   a rotatable Automated Fiber Placement (AFP) head connected to the moveable base,
   wherein the parallel mechanism combined with the moveable base and the rotatable Automated Fiber Placement (AFP) head enables the robot apparatus to have a 6 degree-of-freedom (DOF) movement.

2. The robot apparatus as claimed in claim 1 wherein said parallel mechanism is adapted to be used for composites manufacturing.

3. The robot apparatus as claimed in claim 1 wherein the parallel mechanism provides a 4 Degree-Of-Freedom (DOF) movement comprising two rotations and two translations.

4. The robot apparatus as claimed in claim 1 wherein the prismatic joints are adapted to provide linear motion.

5. The robot apparatus as claimed in claim 4 wherein the prismatic joints are electric, hydraulic or pneumatic.

6. The robot apparatus as claimed in claim 1 wherein the spherical joints are ball joint or serially connected revolute joints.

7. The robot apparatus as claimed in claim 1 wherein the universal joints are cross-link connected or serially connected revolute joints.

8. The robot as claimed in claim 1 further comprising:
   a platform; and
   a base;
      wherein the revolute and universal joints are adapted to be connected to the base, the spherical joints are adapted to be connected to the platform and the prismatic joints are adapted to be connected intermediate the revolute/universal and the spherical joints.

9. The robot apparatus as claimed in claim 8 wherein revolute joints in the two Revolute-Prismatic-Spherical joint (RPS) limbs are located parallel to each other on to the base and adapted to make the two limbs work in the same plane perpendicular to the revolute joints in the two Revolute-Prismatic-Spherical joint (RPS) limbs.

10. The robot apparatus as claimed in claim 9 wherein the universal joints are in 3D space and not constrained on the same plane perpendicular to the revolute joints in the two Revolute-Prismatic-Spherical joint (RPS) limbs.

11. The robot apparatus as claimed in claim 9 adapted for use in composites manufacturing.

12. The robot apparatus as claimed in claim 11 adapted to reinforce fibers and matrix materials comprising thermoset and thermoplastic tapes or prepregs and dry carbon fiber unidirectional materials.

13. The robot apparatus as claimed in claim 1 adapted for use in camera orientation, material grasping and manipulation, machining tool, laser cutting, 3D printing, stabilization platform, motion simulator, automatic painting, automatic welding or non destructive testing.

* * * * *